(No Model.) 3 Sheets—Sheet 1.
J. R. TOPPING.
CENTER SQUARE.
No. 554,402. Patented Feb. 11, 1896.
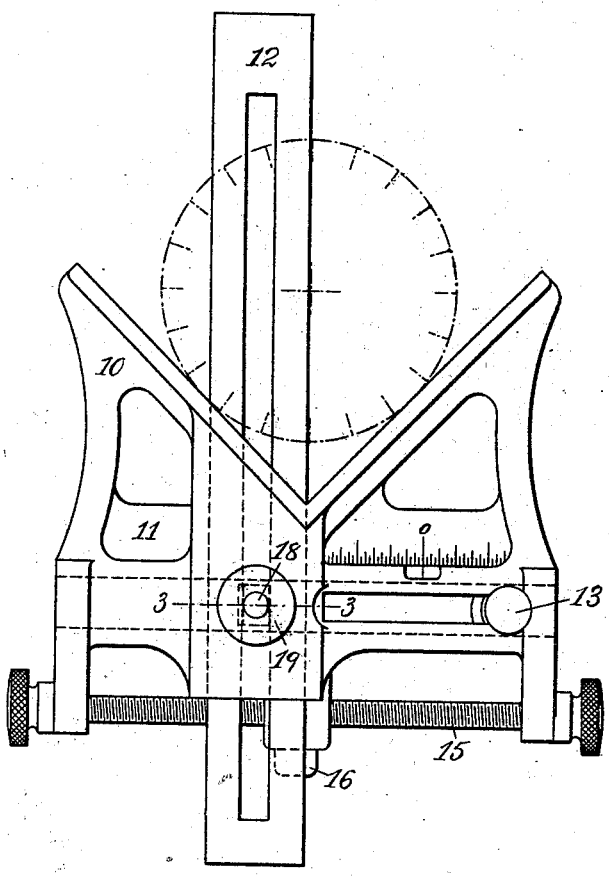
Fig. 1
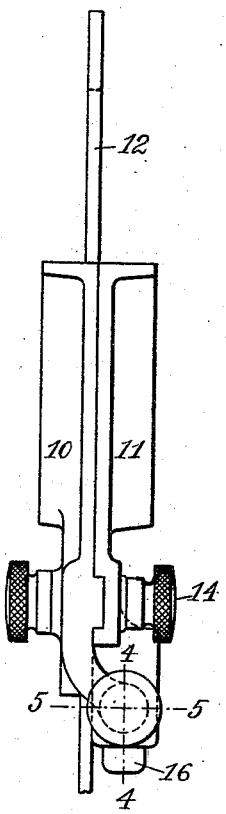
Fig. 2
Fig. 3
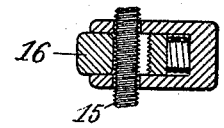
Fig. 4
Fig. 5
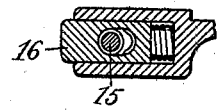
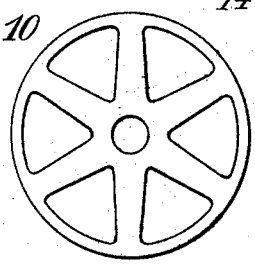
Fig. 10
Witnesses:
H. Mallner
Edward E. Claussen
Inventor:
James R. Topping.
By his attorney
W. H. Honiss.

(No Model.) 3 Sheets—Sheet 2.

J. R. TOPPING.
CENTER SQUARE.

No. 554,402. Patented Feb. 11, 1896.

Witnesses:
H. Mallner
Edward E Claussen

Inventor:
James R. Topping.
By his Attorney
W. H. Honiss (No Model.)  3 Sheets—Sheet 3.
J. R. TOPPING.
CENTER SQUARE.
No. 554,402.   Patented Feb. 11, 1896.
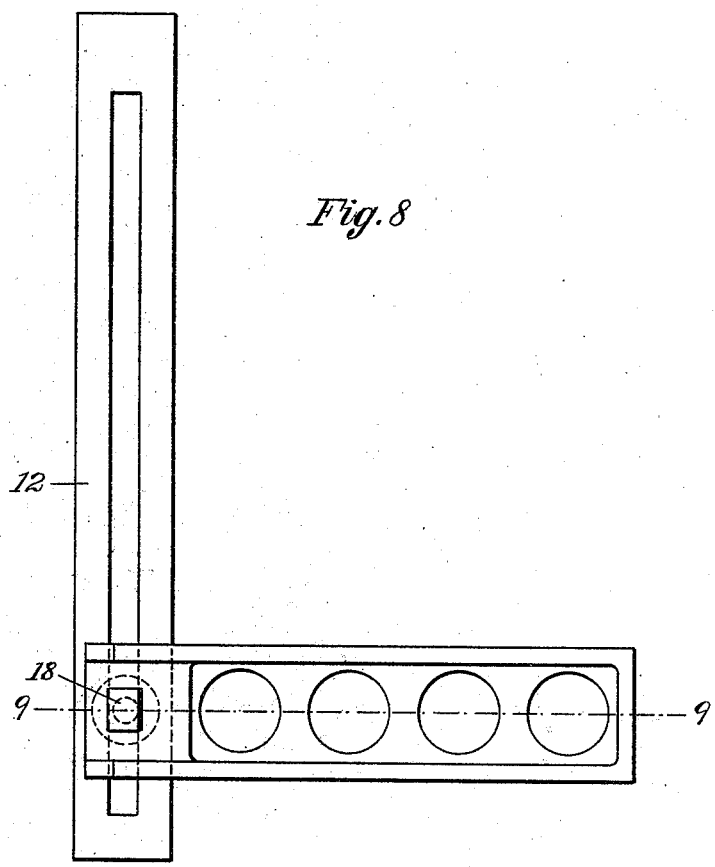
Fig. 8
Fig. 9
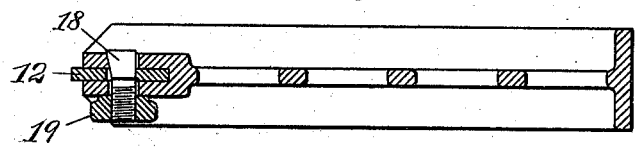
Witnesses:   Inventor:
H. Mallner   James R. Topping
Edward E. Claussen   By his Attorney
   W. H. Honiss

UNITED STATES PATENT OFFICE.

JAMES R. TOPPING, OF HARTFORD, CONNECTICUT.

CENTER-SQUARE.

SPECIFICATION forming part of Letters Patent No. 554,402, dated February 11, 1896.

Application filed July 6, 1894. Serial No. 516,728. (No model.)

*To all whom it may concern:*

Be it known that I, JAMES R. TOPPING, a citizen of the United States, residing at Hartford, in the county of Hartford and State of Connecticut, have invented certain new and useful Improvements in Center-Squares, of which the following is a full, clear, and exact specification.

This invention is a new and improved center or universal square, of a construction which adapts it to uses not ordinarily within the scope of tools of its class, which usually consist of a head having a V-shaped opening of ninety degrees, with a blade so mounted thereon that its working edge passes through the apex of the V and bisects the angle of its opening. Such a tool is used for finding the centers of circular or polygonal objects and for marking mitered joints, but is not adapted to mark or gage lines or surfaces which are at one side of the center of the object embraced by the V-opening of the tool.

The object of my invention is to provide means for carrying the blade to either side of the apex of the V-opening, so as to gage lines on either side of that center, either parallel with each other or in the form of polygons concentric with the center of circular work, as in the laying out of hexagonal heads of bolts. It can also be used to gage lines at any desired distance from the outside of the circle or polygon instead of gaging them with relation to the center thereof.

My invention comprises also improved means of adjusting the parts of the tool, and means for fixing them in their adjusted positions.

Figure 6:
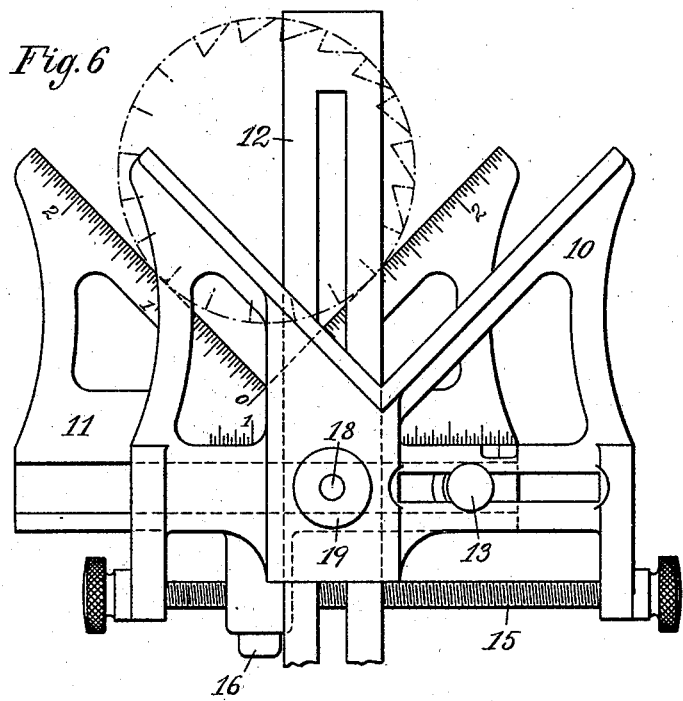
Figure 7:
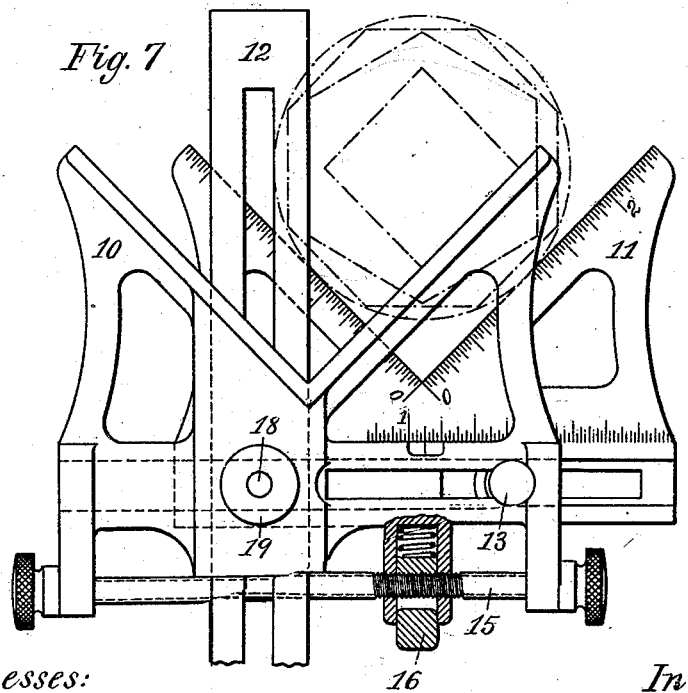

Figure 1 of the drawings is a plan view of my improved tool with the upper or blade-carrying head in its central position, wherein the V-surfaces of the two heads are superimposed and the blade bisects the angular opening thereof. In this position it is adapted to the uses of an ordinary center-square, as indicated by the dot-and-dash lines of a piece of work shown in connection therewith. Fig. 2 is a side view of the tool. Fig. 3 is an end view showing the blade and a portion of the upper head in section, taken on the center line 3 3 of the blade-clamping bolt. Fig. 4 is a sectional plan, taken on the line 4 4 of Fig. 2, of the half-nut by means of which the adjusting-screw is engaged and disengaged, showing it out of engagement. Fig. 5 is a side view, in section, taken on the line 5 of Fig. 3, of the half-nut, also shown in its disengaged position. Fig. 6 is a plan view showing the upper or blade-carrying part of the implement adjusted toward the right-hand side, and representing by dotted lines one of its uses in laying out the teeth of cutters or ratchet-wheels. Fig. 7 is a plan view showing the blade adjusted toward the left side, and showing by dotted lines its use in laying out various polygons. Fig. 8 is a side view of the blade of the preceding figures, used in connection with an auxiliary stock to form a try-square. Fig. 9 is a sectional view taken on the line 9 9 of Fig. 8, showing also a modified form of clamping-bolt for the blade. Fig. 10 shows a wheel the tapering arms of which illustrate another of the uses of this tool.

The numerals 10 and 11 indicate the upper and lower members respectively of the head or stock of my improved instrument. They are each provided with flanged wings bounding a V-shaped opening of substantially ninety degrees, and the upper member is provided with a recess into which a blade 12 is fitted so that one of its edges passes through the apex and bisects the V-opening of the head 10. A tongue in one of the members, located at right angles with the blade, is fitted to slide in a groove in the other member, so as to allow of the lateral adjustment of one member upon the other in a direction transverse to the position of the blade. A bolt 13 and a nut 14 are employed to clamp together the two members of the tool in any position to which they may be adjusted. A screw 15 is journaled near its ends in projecting wings of the upper member, 10, and is preferably provided at each end with a knurled knob, so as to be easily turned by the finger and thumb. The screw passes through a projecting hub of the lower member, in which is fitted a half-nut 16, the construction and arrangement of which are best shown in Figs. 4, 5 and 7. The screw passes through a slot in the half-nut, one end of the slot being plain and the other end provided with a screw-thread corresponding to that of the screw. A spring 17 against the half-nut operates to keep the threaded end of the slot into engagement with the screw, and the end of the nut projects slightly beyond its seat in order that it may be pressed back by the thumb to release the screw from the nut, as shown in Figs. 4 and 5. This is done when the parts are to be adjusted to a considerable distance. Such an adjustment is made to approximately the desired position. Then the nut is allowed to re-engage and the adjustment completed with exactness by means of the screw.

The means for clamping the blade (best shown in Fig. 3) consist of the bolt 18 and the nut 19, carried by the member 10, to which the blade is clamped. The bolt has a square head, one side of which is adapted to bear against the side of the slot in the blade. The opposite side of the bolt is provided with a beveled face, which is adapted to bear against a correspondingly-beveled side of the hole in the upper member, 10, through which it passes, so that when the bolt is drawn up by its nut its head is forced against the side of the slot in the blade, clamping it firmly. The modification of this clamping device shown in Figs. 8 and 9 differs from that just described only in the circumstance that the blade is seated in a bifurcated holder and that the bolt, reaching through both members, has its beveled side seated in that member which lies on the other side of the blade from the nut.

The central position of the parts, wherein the two V portions exactly coincide with the edge of the blade passing through their common apex, is preferably indicated by coinciding lines upon the two members, (marked 0 in Fig. 1.) On either side of this zero-line is graduated a scale, by means of which the amount of sidewise adjustment in either direction from the central position may be determined. The margins of the V-opening on one of the members are also preferably graduated, as shown in Figs. 6 and 7. These graduations are very useful in laying out lines or figures which are to be located from the outside of the work instead of from its center, as indicated by the side of the square in Fig. 7, the sides of which are shown to be five-eighths of an inch from the outside of the work, as read on the scale of the left-hand wing.

An exceedingly useful feature of this implement is the arrangement of the V-wings of the upper member, 10, which remain in a constant relation to the blade, so that the implement remains a center-square wherever the lower member may be adjusted, and is at once available as such by turning it over.

This implement is adapted for use in laying out the arms of pulleys and gears, as illustrated in Fig. 10, whether those arms are to be parallel or tapering. It is first set to one side of the center to suit that side of all the arms, after which it is set a corresponding distance to the opposite side of the center for the other sides of the arms, thus making them all symmetrical. Many other uses will be found for this tool in various lines of work.

I claim as my invention—

1. The herein-described implement consisting of two superimposed members provided with similar V-shaped recesses, one of the members being adapted to carry a blade located with its edge bisecting the V-shaped recess of that member, the two members being so fitted together as to allow of adjustment in a direction transverse to the position of the blade, substantially as described.

2. A center-square, consisting of two superimposed members having similar V-shaped recesses which coincide at their central position, a blade carried by one of the members, adapted to be adjusted endwise thereon, with one of its edges bisecting the V-shaped recess of its member, with means substantially as described for adjusting one of the members upon the other in a direction transverse to the position of the blade.

3. An adjustable center-square, consisting of two superimposed members provided with coinciding V-shaped openings of substantially ninety degrees, one of those members being adapted to carry a blade having its edge bisecting the angle of the V-shaped opening, the members being adapted to slide one upon the other transversely to the position of the blade and in both directions from the coinciding position of the V-shaped openings, substantially as described.

4. An adjustable center-square, consisting of two members adapted to slide one upon the other, and provided with described V-shaped openings, a screw revolubly mounted on one of the members, and a half-nut mounted on the other member, normally held into engagement with the screw and adapted to be disengaged therefrom, substantially as described.

JAS. R. TOPPING.

Witnesses:
WILLIAM W. TOPPING,
W. H. HONISS.